United States Patent [19]

Odenthal et al.

[11] Patent Number: 4,672,276

[45] Date of Patent: Jun. 9, 1987

[54] CRT ASTIGMATISM CORRECTION APPARATUS WITH STORED CORRECTION VALUES

[75] Inventors: Conrad J. Odenthal, Portland; Barry A. McKibben, Beaverton, both of Oreg.

[73] Assignee: Tektronix, Inc., Beaverton, Oreg.

[21] Appl. No.: 614,613

[22] Filed: May 29, 1984

[51] Int. Cl.⁴ .............................................. H01J 29/58
[52] U.S. Cl. .................................... 315/382; 315/370; 313/437
[58] Field of Search .................................. 315/370-371, 315/369, 382; 313/432, 433, 437, 439, 440

[56] References Cited

U.S. PATENT DOCUMENTS

| | | | |
|---|---|---|---|
| 3,544,836 | 12/1970 | Reisner | 315/382 |
| 3,740,608 | 6/1973 | Manber et al. | 315/370 |
| 4,249,112 | 2/1981 | McKibben | 315/382 |

*Primary Examiner*—Theodore M. Blum
*Assistant Examiner*—Gregory C. Issing
*Attorney, Agent, or Firm*—John D. Winkelman; John P. Dellett; John Smith-Hill

[57] ABSTRACT

Apparatus for correcting astigmatism produced by the electromagnetic deflection yoke of a cathode-ray-tube includes plural stigmator electrodes provided with elongated slots through which the cathode-ray-tube's electron beam passes. Appropriate correction voltages, stored in digital memory, are applied to the stigmator and focus electrodes for bringing about re-focusing of the electron beam in appropriate axes for restoring a single point focus on the cathode-ray-rube's screen.

5 Claims, 8 Drawing Figures though the astigmatism distortion is not sufficiently serious to prevent the use of electromagnetically deflected cathode-ray-tubes for many purposes, this distortion can be of considerable concern where finely detailed information is to be presented, e.g. on the screen of a computer terminal portraying a great deal of graphic and alphanumeric information. A raster scan may be employed in the case of CRTs used in these applications wherein the raster is composed of a large number of lines as compared with the conventional TV application.

CRT ASTIGMATISM CORRECTION APPARATUS WITH STORED CORRECTION VALUES

BACKGROUND OF THE INVENTION

The present invention relates to electromagnetically deflected cathode-ray-tubes and particularly to apparatus for correcting distortion of an electron beam as caused by the magnetic field of an electromagnetic deflection yoke.

Electromagnetically deflected cathode-ray-tubes suffer from distortion of the spot written by the tube's electron beam on the CRT screen as a result of nonuniformities in the magnetic deflection field. Thus, when a magnetic deflection yoke in energized to deflect the tube's electron beam from its center position to a more peripheral position, the electrons in the electron beam are deflected somewhat differently depending upon their position in the beam. As a result the electron beam becomes defocused despite the presence of focusing means in the electron gun that generates the beam. As the beam is deflected radially outwardly from the center screen position, the spot tends to become elongated in a direction perpendicular to the direction of deflection. Thus, if the beam is deflected horizontally, to the right of center screen, the spot will tend to be elongated in a vertical direction. Although the astigmatism distortion is not sufficiently serious to prevent the use of electromagnetically deflected cathode-ray-tubes for many purposes, this distortion can be of considerable concern where finely detailed information is to be presented, e.g. on the screen of a computer terminal portraying a great deal of graphic and alphanumeric information. A raster scan may be employed in the case of CRTs used in these applications wherein the raster is composed of a large number of lines as compared with the conventional TV application.

A prior art apparatus for correcting the astigmatism caused by an electromagnetic deflection yoke is described in Ray et al U.S. Pat. No. 3,961,223. This system employs a set of correction coils wound upon a separate annular magnetic core positioned around the neck of the cathode-ray-tube. Current is supplied to this set of coils, via amplifiers for converting correction voltages to coil currents. In a first pair of coils, a current is provided which is proportional to $(Vx)^2-(Vy)^2$, where Vx and Vy are horizontal and vertical deflection signals, while a second set of coils is provided a current proportional to $2VxVy$. Electromagnetic correction devices and the circuitry therefor tend to be expensive and cumbersome not only in respect to the cost of the equipment but also in regard to proper adjustment external to the cathode-ray-tube. Moreover, the correction achieved is somewhat approximate and does not take into account the considerable differences in the astigmatic distortion produced by different magnetic deflection yokes.

SUMMARY OF THE INVENTION

In accordance with the present invetion in a particular embodiment thereof, astigmatism correction apparatus for an electromagnetically deflected cathode-ray-tube includes a first electrode in the tube's electron gun having a first transversely elongated slot through which the tube's electron beam passes, and a second electrode in said electron gun, spaced along the path of the electron beam from the first electrode, the second electrode having a second transversely elongated slot through which the electron beam also passes, wherein the slot in the second electrode is elongated at an angle to the slot in the first electrode. Means responsive to the deflection of the electron beam applies voltages to the first and second electrodes for distorting the cross section of the electron beam in an opposite sense to the distortion caused by the magnetic deflection yoke. As a result, the electron beam is restored in symmetry or point focus and is able to produce a finely defined spot despite the utilization of electromagnetic deflection means, and further without the necessity for an additional magnetic core and coils surrounding the tube.

It is accordingly an object of the present invention to provide an improved astigmatism correction apparatus for electromagnetically deflected cathode-ray-tubes.

It is another object of the present invention to provide improved astigmatism correction apparatus for electromagnatically deflected cathode-ray-tubes wherein such apparatus is inexpensive and forms an integral part of the tube's electron gun.

It is a further object of the present invention to provide an improved astigmatism correction apparatus for electromagnatically deflected cathode-ray-tubes which is accurately adaptable to a particular tube and particular magnetic deflection yoke.

The subject matter of the present invention is particularly pointed out and distinctly claimed in the concluding portion of this specification. However, both the organization and method of operation together with further advantages and objects thereof may best be understood by reference to the following description taken in connection with the accompanying drawings wherein like reference characters refer to like elements.

DRAWINGS

FIG. 1 is a longitudinal cross sectional representation of a magnetically deflected cathode-ray-tube employing astigmatism correction apparatus according to the present invention, FIG. 2 is a perspective, exploded view of a plurality of stigmator electrodes according to the present invention, FIG. 3 is a block diagram of memory means for storing correction voltages applicable to FIG. 2 stigmator electrodes, FIG. 4 is a three dimensional plot of correction voltages applied to a first stigmator electrode, FIG. 5 is a three dimensional plot of correction voltages applied to a second stigmator electrode, FIG. 6 is a three dimensional plot of voltages applies to a focus electrode in the FIG. 1 cathode-ray-tube, FIG. 7 is a schematic representation illustrating astigmatism distortion produced in an electromagnetically deflected cathode-ray-tube, and FIG. 8 schematically illustrates electrostatic correction of astigmatism produced by electromagnetic deflection.

DETAILED DESCRIPTION

Figure 1:
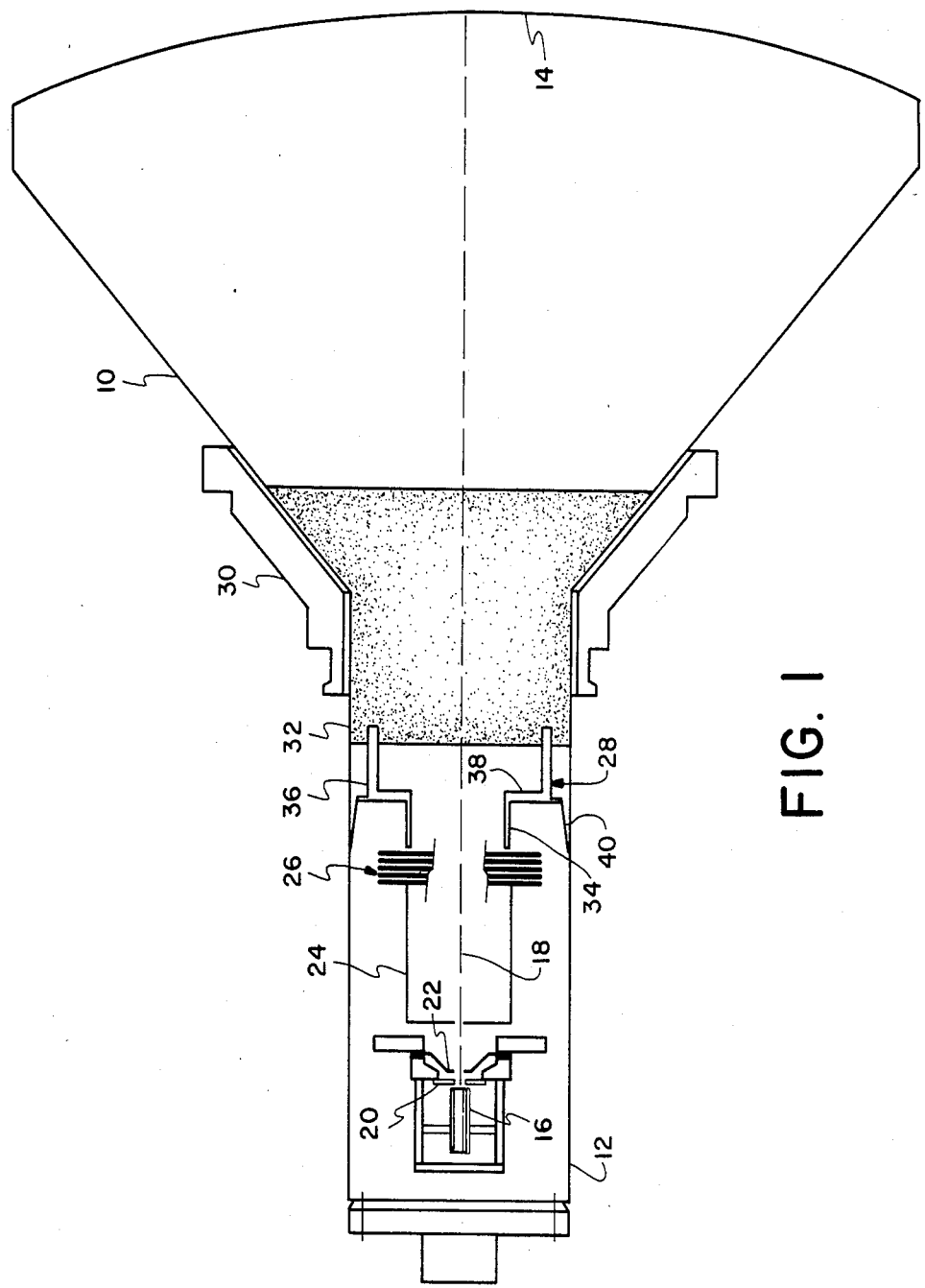

Referring to the drawings and particularly to FIG. 1 illustrating a magnetically deflected cathode-ray-tube employing astigmatism correction apparatus according to the present invention in a particular embodiment thereof, such cathode-ray-tube includes a forward funnel portion 10 and a rearward, cylindrical neck portion 12, the latter housing an electron gun apparatus emitting an electron beam for "writing" on the forward phosphor screen 14. The electron gun comprises a cathode 16 producing electron beam 18 which successively passes through apertures in grid 20 and second grid 22 and through an aperture in one end of anode cylinder 24. At the remote end of anode cylinder 24 in the electron beam 18 traverses a group of wafer electrodes, generally indicated at 26, which will be further described with reference to FIG. 2. After exiting electrodes 26, the electron beam 18 successively passes through focus electrode 28 and magnetic deflection yoke 30. In addition, the inside of the tube in this area is provided with a high resistance coating 32 serving as a further electrode.

The cylindrical focus electrode 28 includes a smaller diameter cylindrical portion 34 positioned adjacent the electrode group 26, and a larger cylindrical portion 36 oriented toward the face of the tube and joined to portion 34 by radial flange 38. The focus electrode is supported from the interior of the neck portion 12 of the tube by "snubber" 40. The purpose of the focus electrode, which will be hereinafter explained in greater detail, is to focus the electron beam to a small spot for "writing" information on the face of the tube.

The magnetic deflection yoke 30 may be of substantially any type commonly used for deflecting an electron beam in a cathode-ray-tube in two orthogonal directions, but is preferably stator-wound on a slotted ferrite core. Lizt wire coils and a suitable magnetic material are preferably used to reduce skin effect and core losses at high deflection frequencies.

Figure 2:
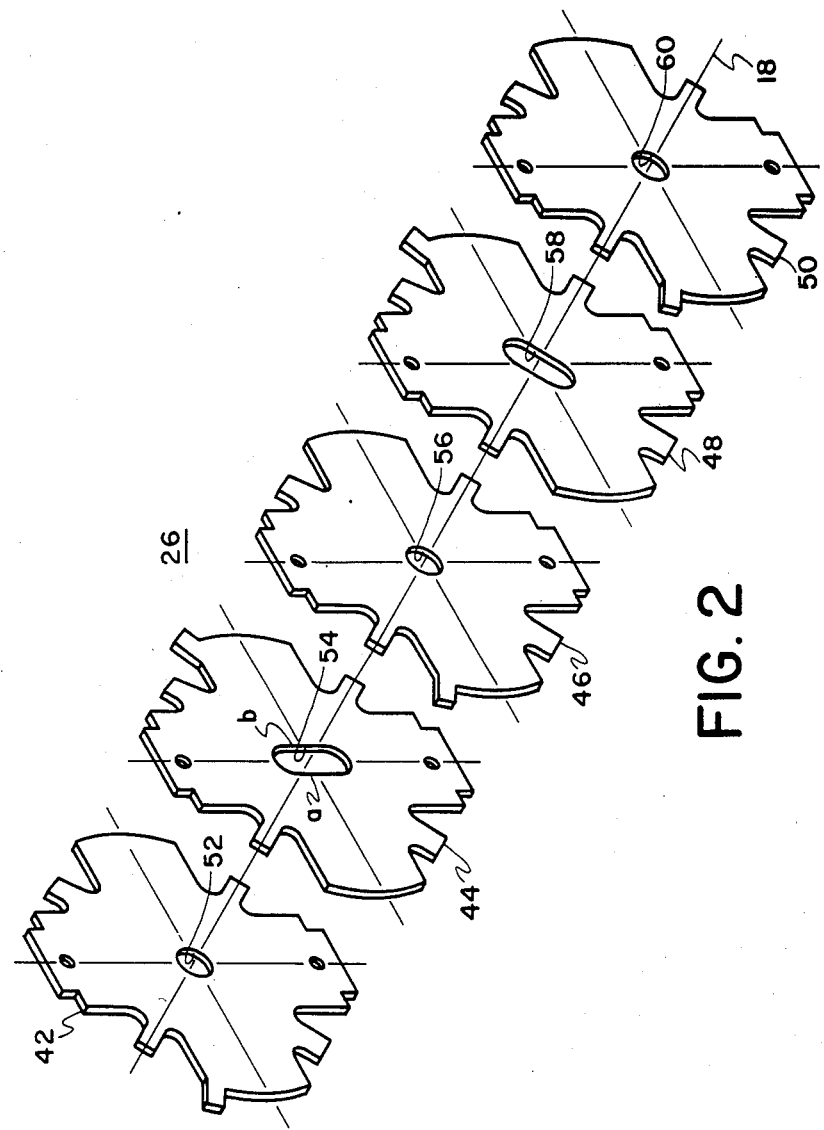

Referring more particularly to FIG. 2, illustrating electrode group 26 in greater detail, electron beam 18 successively passes through apertures in conductive metal wafer electrodes 42, 44, 46, 48 and 50. Apertures 52, 56 and 60 in wafers 42, 46 and 50 respectively are suitably round and of relatively small diameter. For example, in a specific embodiment aperture 52 had a diameter of 0.06 inches, aperture 56 had a diameter of 0.075 inches and aperture 60 had a diameter of 0.075 inches. Apertures 54 and 58, on the other hand, are oval or elliptical in shape, each having a long dimension, i.e. along the major axis, of 0.2 inches and a width along the minor axis of 0.1 inches. Aperture 54 in the illustrated embodiment is oriented vertically, while operation 58 is oriented at an angle of forty-five degrees to the vertical. The electrodes are positioned with the apertures aligned axially such that the electron beam from the anode will pass centrally through each of the apertures. The wafers 42, 44, 46, 48 and 50 are of equal thickness and evenly spaced, with the thickness in the particular embodiment being approximately 0.025 inches and the spacing being approximately 0.02 inches. Electrodes 42, 46 and 50 are connected electrically to anode 24.

The purpose of the electrode group 26 is the correction of astigmatism in the spot formed by beam 18 on screen 14, such astigmatism resulting from the deflection action of yoke 30. Assuming the beam 18 is initially correctly focused to a small round spot at the center of the screen, i.e. without deflection, it is found that deflection of the beam radially outwardly of the screen by yoke 30 produces a somewhat oblong or elliptical spot wherein the major axis of the ellipse is transverse to the direction of deflection. Thus, if the spot is deflected along the x axis or horizontally of the face of the tube to a point far to the right of the center of the tube, the spot will become oblong or elliptical in the vertical or y direction. Of course, the same phenomenon occurs for deflection in the y direction to produce a spot oblong in the x direction. This distortion of the spot is attributable to the magnetic field provided by yoke 30, wherein such magnetic field is characterized by a nonuniform intensity between the center line of the yoke and the inside diameter of tube neck portion 12, the intensity increasing as the tube neck is approached. The electron beam 18 is really cone shaped in this region, being focused from a wider diameter at the position of anode 24 to a narrow spot diameter on the cathode-ray-tube screen as a result of the action of focusing electrode 28 (cooperating with coating 32). As the electron beam passes through yoke 30 and is deflected somewhat outwardly from a focused center position, the electrons on the most radially outward part of the cone will be deflected more than the electrons on the most radially inward part of the cone, resulting in a different lensing action in the radial direction than in the transverse direction.

Figure 7:
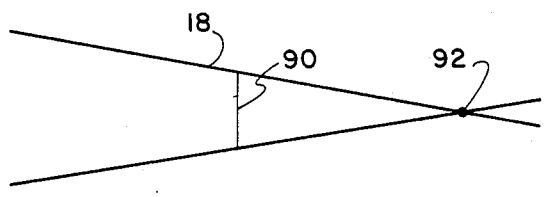

Assuming the beam is deflected in the x direction of the screen, or horizontally, the spot produced by the electron beam on screen 14 would tend to become slightly larger, even without the distortion produced by yoke 30, inasmuch as the longer distance the beam travels to reach the screen causes the beam to reach the screen slightly beyond its point focus. However, as the result of the nonuniform magnetic field generated by yoke 30, the electrons in the horizontal plane, (still assuming x axis deflection) are spread apart, and this x axis lensing action of yoke 30 causes the electron in the horizontal plane to come to a focus at a point farther downstream in the electron beam. The electrons in the vertical plane, on the other hand, are relatively unaffected and continue diverging beyond the original focal point. FIG. 7 is a plan view of the above described beam characterized by a horizontal line focus at 90 (produced by vertically focused electrons) and a vertical line focus 92 (produced by horizontally focused electrons). The electron beam intersects screen 14 just beyond point 92 where the electrons in the vertical plane are more widely separated than those in the horizontal plane, causing the elongated spot in the vertical direction. Of course, the same explanation applies to deflection in the vertical direction or in any other direction for that matter.

The distorted beam can be brought to a better focus simply as a result of a dynamic focusing voltage applied to electrode 28 and appropriately responsive to the deflection of the electron beam. Thus, the electron beam may be made to intersect screen 14 coincident with its circle of least confusion (between line focuses 90 and 92 in FIG. 7) to provide a substantially round spot despite the presence of yoke-caused astigmatism. However, this spot does not represent the optimum condition since it is not as small as the spot resulting from a beam focused to a single point, i.e. the spot which can be produced at the center of the screen.

In accordance with the present invention, electron lenses are formed by "stigmator" wafers 44 and 48 in FIG. 2 in conjunction with the wafers 42, 46 and 50 on either side thereof. Wafers 42, 46 and 48 are electrically connected to anode electrode 24 which, in the specific embodiment, was 3.5 KV positive with respect to the cathode of the electron gun. Dynamic correction voltages are applied to wafers 44 and 48 for the purpose of restoring a single point focus for the electron beam and this point focus is positionable at screen 14 by adjustment of the voltage applied to electrode 28. Wafer 44 forms an electron lens with wafers 42 and 46, while wafer 48 forms an electron lens with wafers 46 and 50.

Figure 8:
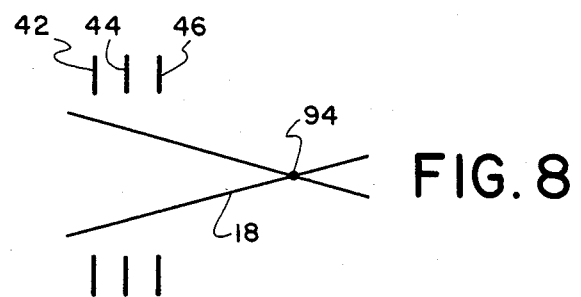

Considering wafer electrode 44, substantially zero correction voltage is applied thereto in the absence of any deflection by yoke 30. In fact for the zero deflection condition the voltage applied to wafer electrode 44 is 3.5 KV in the present embodiment, i.e. the same voltage as applied to anode 24 as well as to wafer electrodes 42 and 46. When the electron beam is then deflected horizontally (after the electron beam passes through the electrode group 26) a relaively negative voltage is simultaneously applied to wafer electrode 44, this voltage being responsive to the extent of deflection in the horizontal or x direction. The relatively negative voltage produces a lensing action with respect to the electron beam, between edges a and b of vertical slot 54 in electrode 44, causing the electrons on opposite sides of the beam (closest to edges a and b) to be repelled from electrode 44 or drawn closer together. This action counteracts the lensing produced by yoke 30 and results in a more axially symmetrical beam capable of producing a smaller spot on screen 14, i.e. wherein the sagittal (radial) and tangential line focuses are brought together at a point. The result is illustrated in FIG. 8, i.e. a single point focus 94.

Now considering deflection of the electron beam in a vertical direction by yoke 30, it will be seen the same wafer electrode 44 can again be employed to restore the unitary point focus of the beam. In this instance, a relatively more positive voltage (higher than 3.5 KV) is applied to wafer electrode 44 as the beam is deflected downstream of electrode group 26 by yoke 30 in a vertical direction. As a result, the electrons across the horizontal section of the beam are brought farther apart (between edges a and b) to restore the unitary point focus of the beam and counter the distortion caused by yoke 30. In the case of vertical deflection of the electron beam by yoke 30, the electrons in the vertical plane of the beam are spread apart by the lensing action of the yoke so as to tend to position the focal point of the electrons in the vertical plane farther downstream. The relatively unaffected electrons in the horizontal plane of the electron beam pass through their focal point and tend to produce an elongated spot transverse to the vertical direction of deflection. Spreading the electrons in the horizontal plane by means of electrode 44 restores the desired single point focus.

It will be observed that if the deflection of the electron beam on the screen is intermediate vertical deflection and horizontal deflection, for instance at an angle approaching forty-five degrees, neither a relatively positive voltage nor a relatively negative voltage, when applied to wafer electrode 44, will produce the desired effect. As the deflection angle changes between the horizontal and the vertical, it would seam the voltage applied to wafer electrode 44 would have to change from a relatively negative value to a relatively positive value, passing through zero at a beam deflection angle of about forty-five degrees. At zero relative voltage applied to wafer electrode 44 (actually the 3.5 KV of the anode 24) the wafer electrode 44 has substantially no effect.

Therefore a second electron lens construction is provided which includes wafer electrode 48 having a slot 58 disposed at an angle intermediate the vertical and horizontal, and specifically at an angle of forty-five degrees in the illustrated embodiment. The wafer electrode 48 cooperates with electrodes 46 and 50 on either side thereof to provide an electron lens effective in restoring a unitary electron beam focus in response to voltages applied to electrodes 48 when the electron beam is deflected in a diagonal direction. Assuming the electron beam is deflected downwardly and to the right (at a minus 45 degrees with respect to the horizontal), then a relatively negative voltage is applied to wafer electrode 48 for restoring beam point focus by analogy to the operation of wafer electrode 44 for deflection in the horizontal direction. Of course, the same effect holds for deflection of the electron beam upwardly and to the left on the screen, i.e. at an angle of 135 degrees.

Similarly, for deflection on the screen at a positive 45 degrees or at a positive 225 degrees, a relatively positive voltage is applied to wafer electrode 48 by analogy to the operation of electrode 44 for deflection in the vertical direction.

With the combined action of the lenses formed with electrodes 44 and 48, proper correction can be applied for any deflection angle. The electrodes 42, 46 and 50, in addition to completing electron lenses with respective electrodes 44 and 48, also provide shielding, and specifically electrode 46 provides shielding between electrodes 44 and 48. The action of the lenses formed by the electrode group 26 may be viewed as one of producing a counter-distortion to the distortion caused by yoke 30.

To a first approximation, the voltage applicable to electrode 44 for achieving the desired corrective effect is proportional to the difference of the squares of the x and y deflection values, i.e. $(y^2 - x^2)$. The voltage applicable to electrode 48, to a first approximation, is proportional to the product of the x and y deflection, i.e. $2xy$. However, approximate correction values are not sufficiently accurate to compensate for the astigmatism effects caused by most deflection yokes, and the same correction values cannot be used to correct for different deflection yokes of apparently identical construction. It is therefore desirable to tailor the voltages applied to the stigmator wafer electrodes to the astigmatism caused by the particular yoke utilized. In the present apparatus, the voltages appropriate for correcting astigmatism for specified areas of beam deflection, i.e. for certain areas of the CRT screen, are stored in memory and accessed by signals related to the deflected positions of the electron beam.

Figure 3:
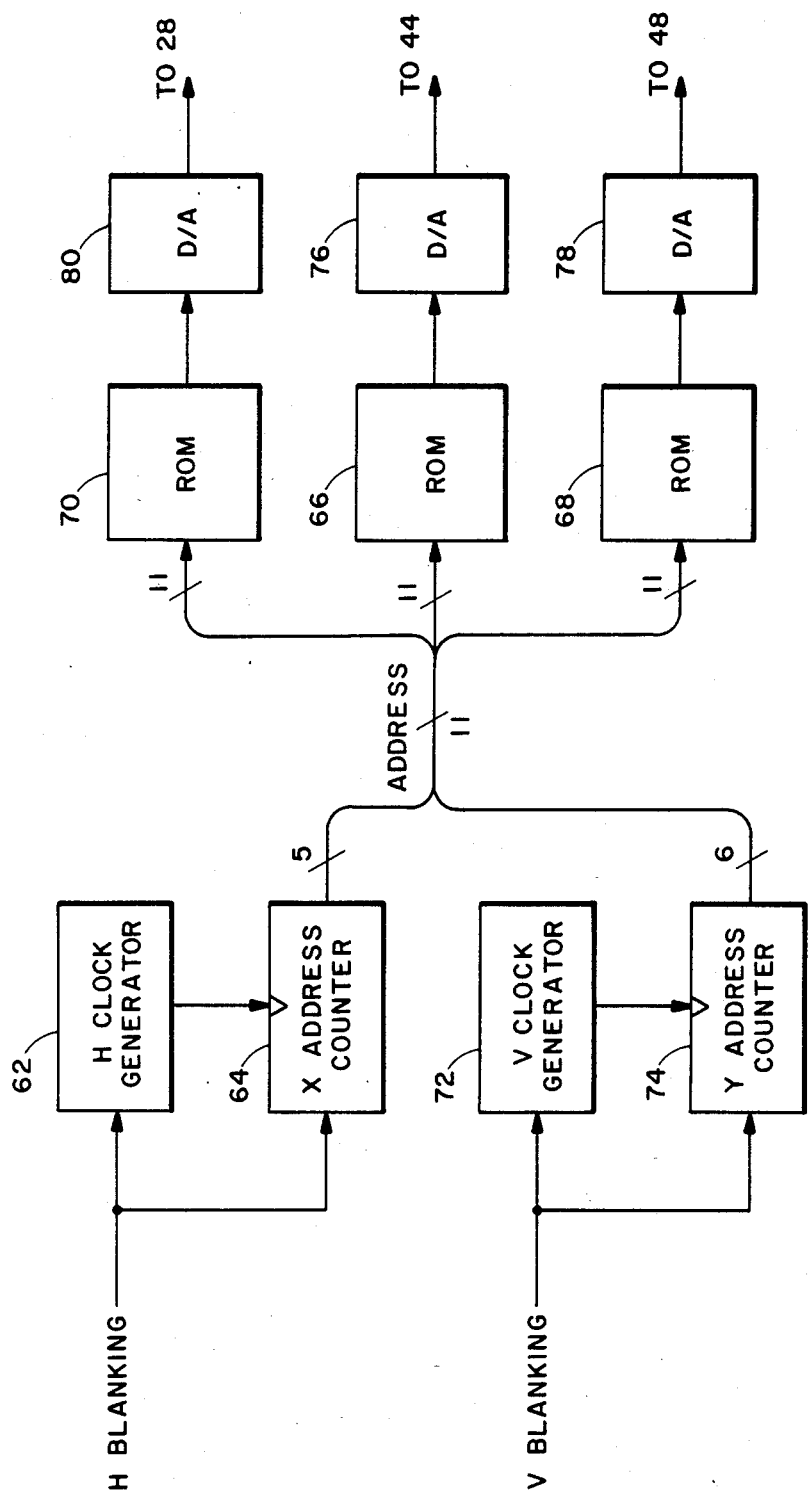

It is assumed for present purposes that a raster scan is produced by conventional horizlontal and vertical deflection circuitry (not shown) connected to yoke 30. Referring to FIG. 3, the horizontal blanking signal from such circuitry is connected as the synchronization input to a horizontal clock generator 62. Clock generator 62 supplies twenty evenly spaced clock pulses between horizontal blanking pulses, i.e. twenty pulses are supplied for each horizontal scan line across the face of the CRT. These clock pulses drive X address counter 64 which is used, in part, to address ROMs (read only memories) 66, 68 and 70. The horizontal blanking pulse resets the address counter 64 at the end of each horizontal scan.

The vertical blanking signal drives vertical clock generator 72 which outputs sixty-four evenly spaced clock pulses between vertical blanking pulses. These clock pulses drive Y address counter 74 which cooperates in addressing ROMs 66, 68 and 70. The vertical blanking pulse resets the Y address counter at the end of each vertical scan.

The ROMs 66, 68 and 70 each have eleven bit addresses, with the five least significant bits being provided by counter 64 and the six most significant being supplied from counter 74. As a result, 1,280 (or 20×64) addresses are sequentially supplied to each of the ROMs for 1,280 distinct regions of the cathode-ray-tube screen. Each location in ROMs 66 and 68 stores the indentification of a unique correction voltage for application to electrodes 44 and 48 respectively for providing proper correction for the electron beam as deflected to each particular region. ROM 70 similarly stores 1,280 values of dynamic focus correction voltage for application to focus electrode 28 for each of the 1,280 deflection regions. Of course, the selection of 1,280 regions on the screen is somewhat arbitrary and any desired division of the screen can be utilized. This number of regions is found sufficient for properly correcting the astigmatism over the face of most CRTs.

The numerical output accessed from ROM 66 is applied to digital-to-analog converter 76 which converts the numerical value to the proper voltage for application to electrode 44. Similarly, the output of ROM 68 is converted to the desired voltage by digital-to-analog converter 78 for application to electrode 48. The accessed output of ROM 70 is applied to digital-to-analog converter 80 from which the focus voltage for electrode 28 is derived.

In accumulating the data for storage in ROM 66, as well as for the other ROMs, a particular cathode-ray-tube with a particular magnetic deflection yoke installed is operated and the electrom beam thereof is deflected by conventional x and y deflection circuitry (not shown) to write twenty-five evenly separated points on the face of the CRT. At each point, the voltages for electrodes 44, 48 and 28 are adjusted to achieve the smallest and most symmetrical, i.e. round, spot. Table A is an example of the voltages found applicable to the electrode 44 in a given instance to procure the best spot. The Z points in the table represent evenly spaced points over the screen of the CRT, from Z(1,1) at the lower left hand corner of the face to Z(5,5) at the upper right hand corner. These voltages are, of course, relative to the 3.5 KV of the cathode-ray-tube anode.

TABLE A

| Z(1,5) | Z(2,5) | Z(3,5) | Z(4,5) | Z(5,5) |
|---|---|---|---|---|
| −42.6 | −3.4 | +3.1 | −6.6 | −54. |
| Z(1,4) | Z(2,4) | Z(3,4) | Z(4,4) | Z(5,4) |
| −58.5 | −15.7 | −6.7 | −17.7 | −62.2 |
| Z(1,3) | Z(2,3) | Z(3,3) | Z(4,3) | Z(5,3) |
| −54.4 | −17.1 | −7.5 | −21.3 | −60.9 |
| Z(1,2) | Z(2,2) | Z(3,2) | Z(4,2) | Z(5,2) |
| −56.1 | −16.3 | −5.8 | −21.9 | −72.4 |
| Z(1,1) | Z(2,1) | Z(3,1) | Z(4,1) | Z(5,1) |
| −36.2 | −4.2 | +2.1 | −12.2 | −47.4 |

The input data from table A is used to generate a surface-describing equation to fit the data and is given by an expression of the following form:

$$V_z = \sum_{m=0}^{4} \sum_{n=0}^{4} a_{mn} x^m y^n.$$

The actual formula in powers of x and y which fits the Table A data is given in tabular form in Table B.

TABLE B

+1.99324 * $10^{-5}$ * $x^4$ * $y^4$
+1.92512 * $10^{-6}$ * $x^4$ * $y^3$
−6.66574 * $10^{-4}$ * $x^4$ * $y^2$
−9.44977 * $10^{-4}$ * $x^4$ * $y^1$
−1.86034 * $10^{-3}$ * $x^4$ * $y^0$
+6.24036 * $10^{-5}$ * $x^3$ * $y^4$
−2.10431 * $10^{-4}$ * $x^3$ * $y^3$

TABLE B-continued

−1.72724 * $10^{-3}$ * $x^3$ * $y^2$
+3.41432 * $10^{-3}$ * $x^3$ * $y^1$
+3.69291 * $10^{-3}$ * $x^3$ * $y^0$
+1.56372 * $10^{-4}$ * $x^2$ * $y^4$
−1.93923 * $10^{-3}$ * $x^2$ * $y^3$
+6.31519 * $10^{-3}$ * $x^2$ * $y^2$
+7.74263 * $10^{-2}$ * $x^2$ * $y^1$
−9.32313 * $10^{-1}$ * $x^2$ * $y^0$
−1.67873 * $10^{-3}$ * $x^1$ * $y^4$
+7.49206 * $10^{-4}$ * $x^1$ * $y^3$
+3.60159 * $10^{-2}$ * $x^1$ * $y^2$
+7.24603 * $10^{-2}$ * $x^1$ * $y^1$
−8.45238 * $10^{-1}$ * $x^1$ * $y^0$
+1.08800 * $10^{-2}$ * $x^0$ * $y^4$
+1.49333 * $10^{-2}$ * $x^0$ * $y^3$
+1.32000 * $10^{-1}$ * $x^0$ * $y^2$
−2.73333 * $10^{-1}$ * $x^0$ * $y^1$
−7.50000 * $10^{0}$ * $x^0$ * $y^0$

ROM 66 is loaded with the correct voltage values for application to electrode 44 in response to various values of x and y deflection, in accordance the formula set forth in Table B. 1280 values corresponding to 1280 screen areas are stored in ROM 66.

Figure 4:
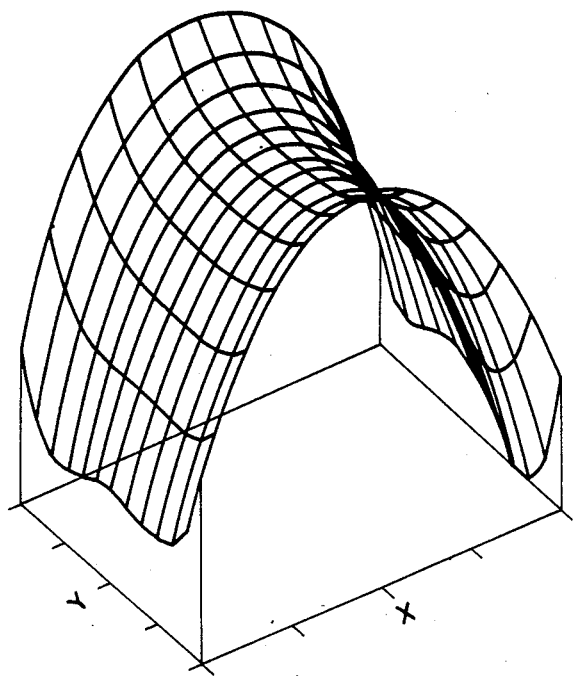

FIG. 4 is a three dimensional plot illustrating the voltages (from ROM 66) applied to electrode 44 for deflection values over the face of the CRT where X corresponds to horizontal deflection and Y corresponds to vertical deflection. It should be emphasized that this particular plot and the voltages represented thereby are given only by way of example and will be different according to the particular tube and particular deflection yoke for which astigmatism is being corrected.

Table C sets forth the formula in powers of x and y for the correction voltages applicable to wafer electrode 48 in the particular example.

TABLE C

−2.33680 * $10^{-5}$ * $x^4$ * $y^4$
−7.59683 * $10^{-5}$ * $x^4$ * $y^3$
+6.79161 * $10^{-4}$ * $x^4$ * $y^2$
+9.85700 * $10^{-4}$ * $x^4$ * $y^1$
+5.55324 * $10^{-4}$ * $x^4$ * $y^0$
+1.29161 * $10^{-4}$ * $x^3$ * $y^4$
−4.94461 * $10^{-4}$ * $x^3$ * $y^3$
−3.32621 * $10^{-3}$ * $x^3$ * $y^2$
+1.31195 * $10^{-2}$ * $x^3$ * $y^1$
+6.60836 * $10^{-3}$ * $x^3$ * $y^0$
+1.08735 * $10^{-3}$ * $x^2$ * $y^4$
+3.23810 * $10^{-3}$ * $x^2$ * $y^3$
−3.25918 * $10^{-2}$ * $x^2$ * $y^2$
−5.01701 * $10^{-2}$ * $x^2$ * $y^1$
−1.08844 * $10^{-2}$ * $x^2$ * $y^0$
−3.83746 * $10^{-3}$ * $x^1$ * $y^4$
+2.14476 * $10^{-2}$ * $x^1$ * $y^3$
+1.03984 * $10^{-1}$ * $x^1$ * $y^2$
+3.16667 * $10^{-2}$ * $x^1$ * $y^1$
+2.76190 * $10^{-1}$ * $x^1$ * $y^0$
+2.45333 * $10^{-3}$ * $x^0$ * $y^4$
−1.86667 * $10^{-2}$ * $x^0$ * $y^3$
−9.53333 * $10^{-2}$ * $x^0$ * $y^2$
+4.76667 * $10^{-1}$ * $x^0$ * $y^1$
+5.10000 * $10^{0}$ * $x^0$ * $y^0$

Figure 5:
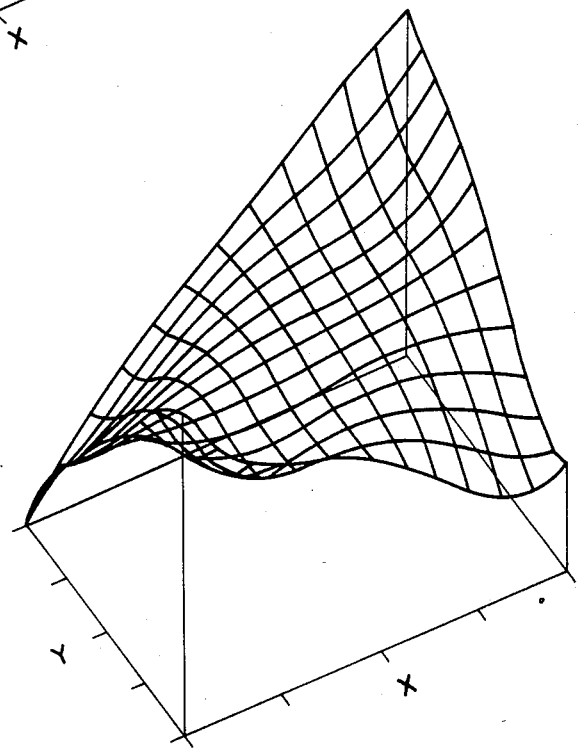

FIG. 5 is a three dimensional plot of the voltages applicable to electrode 48 over the range of X and Y deflection as obtained from the formula of Table C. Again, 1,280 values are stored in ROM 78 corresponding to 1,280 separate areas of the screen.

Table D sets forth the formula for the focus correction voltage applicable to focus electrode 28.

TABLE D

−4.53145 * $10^{-5}$ * $x^4$ * $y^4$

Figure 6:
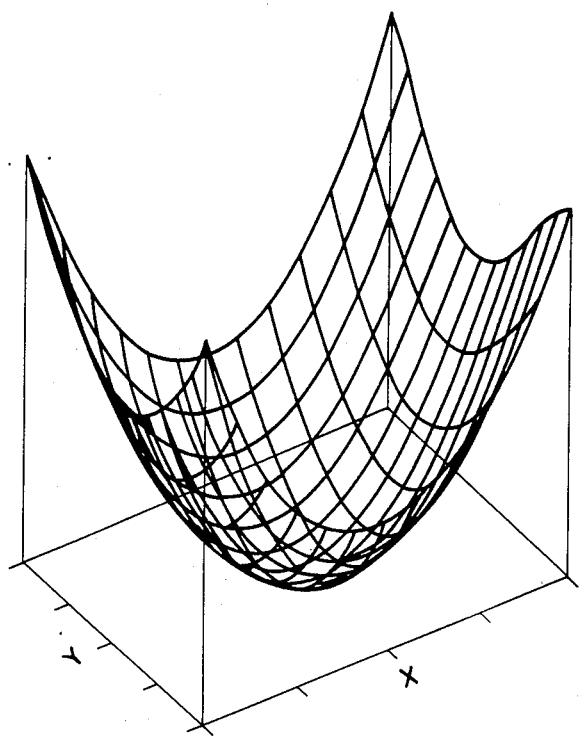

TABLE D-continued $+1.48086 * 10^{-6} * x^4 * y^3$
$+1.59378 * 10^{-3} * x^4 * y^2$
$-1.17544 * 10^{-3} * x^4 * y^1$
$-1.66597 * 10^{-3} * x^4 * y^0$
$-1.03661 * 10^{-5} * x^3 * y^4$
$+7.98186 * 10^{-4} * x^3 * y^3$
$-1.64561 * 10^{-3} * x^3 * y^2$
$-1.23745 * 10^{-2} * x^3 * y^1$
$+1.55491 * 10^{-2} * x^3 * y^0$
$+9.90476 * 10^{-4} * x^2 * y^4$
$+2.59410 * 10^{-3} * x^2 * y^3$
$-3.53061 * 10^{-2} * x^2 * y^2$
$+3.07256 * 10^{-2} * x^2 * y^1$
$+3.65306 * 10^{0} * x^2 * y^0$
$-3.83492 * 10^{-3} * x^1 * y^4$
$-1.58730 * 10^{-2} * x^1 * y^3$
$+1.82063 * 10^{-1} * x^1 * y^2$
$+7.53968 * 10^{-2} * x^1 * y^1$
$-1.47619 * 10^{0} * x^1 * y^0$
$+7.46667 * 10^{-3} * x^0 * y^4$
$-6.93333 * 10^{-2} * x^0 * y^3$
$+3.63333 * 10^{0} * x^0 * y^2$
$+1.23333 * 10^{0} * x^0 * y^1$
$+2.50800 * 10^{+3} * x^0 * y^0$ FIG. 6 is a three dimensional plot of the voltages as derived from the formula of Table D and as stored in ROM 70 for application to focus electrode 28. To a first approximation, the focus correction is proportional to $(x^2+y^2)$, but it will be seen that for the particular tube under consideration, the correction varies therefrom.

As will be understood, the data of the type described in Table A will be obtained for the wafer electrode 48 and the focus electrode 28, as well as for the wafer electrode 44, and then the corresponding formula (Table B, C or D) is derived by known computational techniques for providing an interpolated approximation for remaining points across the face of the CRT. In each case, twenty-five simultaneous equations are solved in a known manner to provide the constants in the first columns of Tables B, C, and D, using the correction and deflection values (Table A type data) for each of twenty-five points. The Table B, C, and D formulas are then employed to obtain the values for storage in the ROMs.

The cathode-ray-tube with correction according to the present invention is able to produce an electron beam with extremely high definition for writing a small spot on the screen of the cathode-ray-tube at substantially any point over its area. Therefore, such cathode-ray-tube can portray detailed data and graphic information for use in computer terminals and the like.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A raster scan cathode-ray tube display apparatus, comprising a cathode-ray tube having a display screen and an electron gun for forming an electron beam directed towards said screen, an electromagnetic deflection yoke associated with the cathode-ray tube, deflection circuitry for driving the deflection yoke to generate a magnetic field for deflecting said beam across said screen in first and second mutually perpendicular directions at first and second frequencies respectively so as to define a raster pattern on said screen, the deflection yoke producing cross-sectional distortion of the electron beam dependent on the deflection of the beam, and said deflection circuitry also generating a first synchronization signal at said first frequency and a second synchronization signal at said second frequency, a plurality of electrodes disposed along the path of said beam and through which the beam passes before reaching the deflection yoke, memory means storing values proportional to voltages appropriate for application to said electrodes to compensate for the cross-sectional distortion produced by the deflection yoke, said memory means having m×n separately addressable memory locations in which respective values are stored, and memory accessing means responsive to said first synchronization signal to generate less significant address bits at a frequency that is m times and first frequency and responsive to said second synchronization signal to generate more significant address bits at a frequency that is n times said second frequency, said memory accessing means also being operative to apply the more significant and less significant adress bits to the memory means for accessing the stored values and to apply said voltages to said electrodes to produce an electrostatic field that dynamically compensates for the distortion produced by the deflection yoke.

2. The apparatus according to claim 1, wherein said memory accessing means comprise first and second clock generators responsive to said first and second synchronization signals respectively for generating first and second clock signals at m times said first frequency and n times said second frequency respectively, and first and second address counters responsive to said first and second clock signals for generating said less significant address bits and said more significant address bits respectively.

3. The apparatus of claim 1, wherein said memory means comprises read-only memory devices.

4. The apparatus of claim 1, wherein said plurality of electrodes include a first electrode having a transversely elongated slot and a second electrode spaced along said path from said first electrode and having a transversal elongated slot, the slot in said second electrode being disposed at an angle to the slot in the first electrode.

5. The apparatus of claim 1, further including focus electrode means and means for applying a voltage thereto in response to beam deflection for focusing said beam at said screen, the voltage applying means including focus memory means addressed in accordance with said deflection and storing values proportional to voltages appropriate for application to the focus electrode means to bring about focusing of the beam at said screen.

* * * * *